United States Patent
Sun et al.

(10) Patent No.: US 11,939,708 B2
(45) Date of Patent: Mar. 26, 2024

(54) WEFT-KNITTED SPACER FABRIC AND A PREPARATION METHOD THEREOF, USE OF THE FABRIC FOR THE PREPARATION OF A COMPOSITE MATERIAL AND A COMPOSITE MATERIAL COMPRISING THE SAME

(71) Applicant: BASF SE, Ludwigshafen am Rhein (DE)

(72) Inventors: Xiao Yu Sun, Shanghai (CN); Xiaojun Wu, Shanghai (CN); Li Chao Zhu, Shanghai (CN); Ren Zheng Zhang, Shanghai (CN); Wenyan Zhu, Wyandotte, MI (US); Xueli Hu, Shanghai (CN); Hairu Long, Shanghai (CN)

(73) Assignee: BASF SE, Ludwigshafen Am Rhein (DE)

( * ) Notice: Subject to any disclaimer, the term of this patent is extended or adjusted under 35 U.S.C. 154(b) by 835 days.

(21) Appl. No.: 17/046,587

(22) PCT Filed: Apr. 8, 2019

(86) PCT No.: PCT/EP2019/058772
§ 371 (c)(1),
(2) Date: Oct. 9, 2020

(87) PCT Pub. No.: WO2019/197319
PCT Pub. Date: Oct. 17, 2019

(65) Prior Publication Data
US 2021/0115600 A1   Apr. 22, 2021

(30) Foreign Application Priority Data
Apr. 13, 2018 (CN) .......................... 201810331217.9

(51) Int. Cl.
*D04B 1/22* (2006.01)
*A43B 13/12* (2006.01)
(Continued)

(52) U.S. Cl.
CPC ................ *D04B 1/22* (2013.01); *A43B 13/12* (2013.01); *C08J 9/125* (2013.01); *D04B 1/16* (2013.01);
(Continued)

(58) Field of Classification Search
CPC ... D04B 1/22; D04B 1/16; D04B 1/18; D04B 15/70; D04B 1/104; D04B 1/14;
(Continued)

(56) References Cited

U.S. PATENT DOCUMENTS 5,589,245 A   12/1996   Roell
6,755,052 B1   6/2004   Sytz
(Continued)

FOREIGN PATENT DOCUMENTS

CA    3038748 A1 *  4/2018  .......... B29C 44/1276
CN   102108601 A      6/2011
(Continued)

OTHER PUBLICATIONS

Schaefer, et al., "Ein staerkender Zusammenschluss—Verbundstrukturen aus 3D-Gewirke und Polyurethanschaumstoff mit bemerkenswerter Verstaerkungswirkung", Kettenwirk-Praxis, Karl Mayer, Jan. 1, 2014, pp. 34-36.
(Continued)

*Primary Examiner* — Irina S Zemel
(74) *Attorney, Agent, or Firm* — Armstrong Teasdale LLP

(57) ABSTRACT

Described herein is a weft-knitted spacer fabric and a preparation method thereof, a polyurethane foam composite material including the fabric, a preparation method of the composite material and its use in shoe materials. The weft-
(Continued)

knitted spacer fabric consists of an upper surface layer, intermediate spacer yarns, and a lower surface layer, and the upper surface and the lower surface layer are connected by the tuck of the spacer yarns in the upper surface and the lower surface layer to form a three-dimensional structure in an integrated manner. The different selected tuck needle changes the connecting distance and the number of connections of the tuck, and the thickness of the spacer fabric and the arrangement density of the spacer yarns are changed by the action of the upper and lower surface layers of elastic yarns.

26 Claims, 5 Drawing Sheets

(51) Int. Cl.
| | |
|---|---|
| C08J 9/12 | (2006.01) |
| D04B 1/16 | (2006.01) |
| D04B 1/18 | (2006.01) |
| D04B 1/26 | (2006.01) |
| D04B 15/70 | (2006.01) |
| D06N 3/00 | (2006.01) |
| D06N 3/12 | (2006.01) |
| D06N 3/14 | (2006.01) |

(52) U.S. Cl.
CPC ............... *D04B 1/18* (2013.01); *D04B 15/70* (2013.01); *D06N 3/0009* (2013.01); *D06N 3/0043* (2013.01); *D06N 3/0086* (2013.01); *D06N 3/123* (2013.01); *D06N 3/14* (2013.01); *C08J 2203/10* (2013.01); *C08J 2375/08* (2013.01); *C08J 2467/02* (2013.01); *C08J 2475/08* (2013.01); *C08J 2477/06* (2013.01); *D10B 2401/08* (2013.01); *D10B 2403/0222* (2013.01); *D10B 2501/043* (2013.01)

(58) Field of Classification Search
CPC ....... A43B 13/12; C08J 9/125; C08J 2203/10; C08J 2375/08; C08J 2467/02; C08J 2475/08; C08J 2477/06; C08J 2475/04; C08J 2477/00; D06N 3/0009; D06N 3/0043; D06N 3/0086; D06N 3/123; D06N 3/14; D06N 3/12; D10B 2401/08; D10B 2403/0222; D10B 2501/043; D10B 2403/0223; D10B 2505/02; B32B 27/06; B32B 27/36

See application file for complete search history.

(56) References Cited

U.S. PATENT DOCUMENTS

| | | |
|---|---|---|
| 7,913,520 B1 | 3/2011 | Chen et al. |
| 2013/0139407 A1 | 6/2013 | Brongers et al. |
| 2014/0227505 A1 | 8/2014 | Schiller et al. |
| 2015/0376823 A1 | 12/2015 | Daube et al. |

FOREIGN PATENT DOCUMENTS

| | | | |
|---|---|---|---|
| CN | 102443936 A | | 5/2012 |
| CN | 102517759 A | | 6/2012 |
| CN | 103025191 A | | 4/2013 |
| CN | 105014984 A | | 11/2015 |
| CN | 105442163 A | | 3/2016 |
| CN | 205631367 U | | 10/2016 |
| CN | 208774210 U | | 4/2019 |
| DE | 29816223 U1 | | 1/1999 |
| FR | 1393269 | * | 3/1965 |
| WO | 02064870 A1 | | 8/2002 |
| WO | 2018073109 A1 | | 4/2018 |

OTHER PUBLICATIONS

International Search Report and Written Opinion for corresponding PCT/EP2019/058772 dated Aug. 23, 2019, 11 pages.

* cited by examiner

R: Rebound (%); H: Hardness (Asker C)

WEFT-KNITTED SPACER FABRIC AND A PREPARATION METHOD THEREOF, USE OF THE FABRIC FOR THE PREPARATION OF A COMPOSITE MATERIAL AND A COMPOSITE MATERIAL COMPRISING THE SAME

CROSS-REFERENCE TO RELATED APPLICATIONS

This application is a U.S. National Phase Application of International Patent Application No. PCT/EP2019/058772, filed on Apr. 8, 2019, which claims the benefit of priority to Chinese Patent Application Number 201810331217.9, filed Apr. 13, 2018, the entire contents of which are hereby incorporated by reference herein.

TECHNICAL FIELD

The present invention relates to a weft-knitted spacer fabric and a preparation method thereof, a polyurethane (PU) foam composite material comprising the fabric, a preparation method of the composite material and its use in shoe materials.

BACKGROUND

Sole is an important part of all kinds of shoes to withstand the compressive load. Especially for sport and fitness shoes, the sole should have good compression elasticity, shock absorption, durability, and lightness in order to provide comfortable support for the wearer and relieve foot fatigue during walking. Knitting (including weft and warp knitting) spacer fabric (also called three-dimensional fabric, 3D fabric) is a three-dimensional structure formed by connecting the upper and lower surface layers together with spacer yarns. This characteristic of the three-dimensional structure determines that the knitted spacer fabric has good compression resistance, air permeability, moisture permeability, warmth-keeping, sound insulation, rebound and shock absorption, and is one of the materials for making the sole. However, when the knitted spacer fabric is subjected to a compressive load, there is a shear force between the upper and lower surface layers, and the repeated compression would cause the spacer yarns to lodge to "destablize", resulting in the loss of the cushioning effect of the knitted spacer fabric.

The prior art discloses a variety of spacer fabrics and the methods of making the same.

CN 102108601A discloses a weaving method for a three-dimensional fabric with different thickness and the structure of the three-dimensional fabric. The weaving method mainly comprises weaving the yarns into a three-layer structure by a knitting machine, and the fabric includes a top surface layer, an intermediate thickness layer, and a bottom surface layer, and both ends of the intermediate thickness layer are respectively connected with the top surface layer and the bottom surface layer. The thickness of the three-dimensional fabric is determined by the changes of both the length and angle of the yarns in the intermediate thickness layer. This application discloses that the three-dimensional fabric can be used as an insole. The application does not mention how to achieve the change in the length of the intermediate yarn on the knitting machine. The three-dimensional fabric described in this application can only have a thickness change in the longitudinal direction, and it is not possible to achieve a partial thickness change in the courses and wales at the same time; furthermore, the three-dimensional fabric cannot achieve the change in the yarn density of the intermediate layer.

CN 102443936A discloses a method for forming a woven three-dimensional fabric with variable thickness, comprising using a two-dimensional weaving machine equipment, weaving and stitching multiple layers of 3D fabric on a basic structure by means of a stitching method, and gradually changing the thickness of the fabric to obtain a three-dimensional woven fabric with variable thickness. In the application, both of the surface layers and the intermediate layer of the three-dimensional fabric are fabrics and then they are woven by the stitching method to obtain the final fabric; and the thickness of the fabric is achieved by changing the thickness of the weft yarn in the intermediate layer. Therefore, the fabric structure and the weaving method and the equipment of the invention are very complicated.

CN 102517759A discloses a method for producing a woven fabric with different thickness on the same cloth on an ordinary shuttleless loom, which solves the problem of changing the fabric thickness on the same cloth without shutdown. The technical solution is: firstly designing a number of weaving diagrams with the required fabric thickness respectively, then arranging the weaving diagrams in sequence, changing the weaving diagrams at intervals, and then simultaneously lifting the warp yarns on the extra heald frame and the warp yarns of the adjacent system when the thickness of the fabric is reduced by one layer each time. In a similar fashion, it is possible to weave a fabric with varying thickness on an ordinary shuttleless loom. The change in the thickness of the fabric in this application is achieved by changing the number of layers in the intermediate layer of the fabric.

CN 105442163A discloses a method for weaving a spacer fabric having different thickness with a relief effect. This is achieved by weaving on a computerized flat knitting machine to form different thickness of the spacer fabric in the transverse and longitudinal directions by varying the loop length of the feeding spacer yarns. The disadvantage of this invention is that when the gauge of the computerized flat knitting machine is determined, the distance between the front and rear needle bars is also determined, thus the range of the changes in the loop length of the spacer yarns connecting the front and rear needle bars (i.e., the thickness of the spacer fabric to be adjusted) is very limited. If the loop length of the spacer yarns is too long, the spacer yarns will be too loose and slip out of the needle hooks to cause the drop of stitches; if the loop length of the spacer yarns is too short, the spacer yarns will be too tight and cause the spacer yarns to break. Moreover, the change of the loop length is achieved by the stitch cam driven by a program-controlled step motor, and it is difficult to achieve a great change of the loop length within the range of the several adjacent or close stitches when weaving the same course. In addition, this invention cannot change the arrangement density of the spacer yarns.

US 20150376823A1 discloses a knitted fabric comprising: a first covering layer; a second covering layer; and an arrangement of pile threads formed as spacer threads between the first covering layer and the second covering layer, wherein each covering layer comprises multiple stitch rows arranged one after another, wherein the spacer threads have different lengths, and the spacer threads woven into each stitch row have equal lengths, wherein the spacer threads in a first width region have a different length than the spacer threads in a second width region, and wherein, for at least two adjacent stitch rows, one stitch row is connected to spacer threads of a first length in the first width region and one stitch row is connected to spacer threads of a second length in the second width region.

WO 02/064870A1 discloses a three-dimensional double-face fabric consisting of two outer layers (A, B), spaced apart and linked together by binder yarns (F), which extend substantially perpendicular to the surfaces opposite the two layers (A, B). The invention is characterised in that in some of the zones of the fabric, the binder yarns are of at least two different types, having different contraction and shrinking characteristics, said two types of binder yarns working complementarily so that they form zones with different thickness providing the fabric with a three-dimensional effect.

DE 29816223U1 discloses a three-dimensional structured textile, characterized in that it consists of the high-deep structured surface (2), the unpatterned surface (3) and the intermediate and irregularly varying spacer (4) consisting of the pile yarn systems (5 and 6), which intersect at an angle of 45° to 90°.

CN 103025191A discloses an insole comprising a knitted spacer fabric. The knitted spacer fabric includes a top layer, a bottom layer, and a plurality of spacing lines extending between the top layer and the bottom layer. The insole includes a support element that is laminated on the lower surface of the bottom layer and extends from the midfoot area of the insole to the heel area of the bolster, as an additional cushioning and non-slip insert. The disadvantage of the insole including the knitted spacer fabric is that the support element is an additional insert, and it fails to form an integral part with the knitted spacer fabric, which would easily result in separation and destruction of the two parts; furthermore, except for the supporting element, in other parts of the insole, the compressive load is borne only by the knitted spacer fabric, and the bearing performance is poor. The thickness of the spacer fabric of this invention does not vary. Moreover, it also does not disclose filling the spacer fabric with a resin.

As can be seen from the above, the spacer fabrics in the prior art described above still have drawbacks. Therefore, there is a need in the art for a spacer fabric that can change the arrangement density of the spacer yarns according to the bearing conditions of the different parts of the sole, and increase the density of the spacer yarns at locations where the load is heavy, and conversely, reduce the arrangement density of the spacer yarns, thereby fully exploit the different reinforcing effects of the weft-knitted spacer fabric in different parts of the shoe sole. In addition, the thickness change of the spacer fabric is consistent with the thickness change of the sole, and it plays a reinforcing role in the parts with different thickness; furthermore, by compounding the weft-knitted spacer fabric with a PU foam, the weft-knitted spacer fabric can not only eliminate the phenomenon of the lodging of the spacer yarns caused by the repeated compression of the weft-knitted spacer fabric, but also can improve the strength of the PU foam, thereby significantly improving the overall compression resistance and durability of the sole material.

In addition, PCT/CN2016/000574 application filed by the applicant on Oct. 17, 2016 discloses a method for preparing a 3D-spacer reinforced polyurethane composite material having a uniform thickness and a uniform density, and the use of the composite material in shoe materials. The 3D-spacer enhances the performance of PU composite material.

Therefore, another object of the present invention is to provide a PU composite material, a preparation method thereof and the use of the composite material in shoe materials, wherein the spacer fabric of the present invention is used. The thickness change of the spacer fabric is consistent with the thickness change of the sole, and it plays a reinforcing role in the parts with different thicknesses. In addition, the arrangement density of the spacer yarns can be changed according to the bearing condition of the different parts of the sole, and the arrangement density of the spacer yarns is increased at locations where the load is heavy, and conversely, the arrangement density of the spacer yarns is reduced, thereby the different reinforcing effects of the weft-knitted spacer fabric in different parts of the shoe sole are fully exploited.

DETAILED DESCRIPTION

In the first aspect of the present invention, a weft-knitted spacer fabric is provided. The weft-knitted spacer fabric consists of an upper surface layer, intermediate spacer yarns, and a lower surface layer, wherein both of the upper surface layer and the lower surface layer use non-elastic and elastic yarns, and there are tucks formed by the spacer yarns between the upper and lower surface layers, so that the upper surface is connected with the lower surface layer to form a three-dimensional structure in an integrated manner, characterized in that by selectively using a tuck with a different connecting distance in a local region than other regions and by the action of the elastic yarns in the upper and lower surface layers, the thickness of the local region is changed.

Specifically, in one embodiment, the thickness in the wale direction of the weft-knitted spacer fabric can be changed by changing the connecting distance of the tuck in different courses and by the action of the elastic yarns in the upper and lower surface layers.

In another embodiment, the thickness in the course direction of the weft-knitted spacer fabric can be changed by changing the connecting distance of the tuck in the different loops in the same course and by the action of the elastic yarns in the upper and lower surface layers.

In addition, in the spacer fabric of the present invention, distributed meshes are formed in the upper and lower surface layers by selectively loop transferring, so that voids are formed which would facilitate the injection of the PU raw material to fill the spaces between the spacer yarns.

In another embodiment, the arrangement density of the spacer yarns in the spacer fabric of the present invention can be varied as desired. Therefore, the arrangement density of the spacer yarns can be changed according to the bearing conditions of different parts of the sole, and the arrangement density of the spacer yarns is increased at locations where the load is heavy (e.g. heel), and conversely, the arrangement density of the spacer yarns is reduced, thereby the different reinforcing effects of the weft-knitted spacer fabric in different parts of the shoe sole are fully exploited.

In the spacer fabric of the present invention, the connecting distance of the tuck and the arrangement density of the spacer yarns in a local region can be changed at the same time or separately.

Moreover, it has been found that the inclination angle of the spacer yarns would affect the mechanical properties of the resulted weft-knitted spacer fabric reinforced PU composites. In the context of the present invention, "the inclination angle of the spacer yarns" is defined as the angle of the spacer yarns in respect to the top or bottom layer of the fabric. The angle influences the anisotropic effect, and there will be no anisotropic effect without this angle. The inclination angle of the spacer yarns may be from about 40 to about 85°, preferably from about 50 to about 80°, more preferably from about 60 to about 80°, even more preferably from about 65 to about 80°, most preferably from about 65 to about 75°.

In the spacer fabric of the present invention, both the upper surface layer and the lower surface layer use two yarns, non-elastic and elastic yarns. The applicant has unexpectedly found that if only the non-elastic yarns are used, the spacer fabric would shrink very little and would not deflect the spacer yarns in a direction perpendicular to the plane of the fabric to increase the fabric thickness. If only the elastic yarns are used, the spacer fabric would shrink greatly, resulting in an excessively high density of the fabric surface layer and difficult impregnation of the PU. The combination of the two yarns, i.e., the non-elastic and elastic yarns, can increase the fabric thickness and also facilitate the impregnation of PU. Preferably, the loop exhibits a plating relationship to ensure that the non-elastic loop (plating yarn) covers the elastic loop (ground yarn). As an example, it can be mentioned that a non-elastic 167 dtex/96F low-elasticity polyester yarn is used as the plating yearn, and an elastic 44 dtex nylon/33 dtex spandex covered yarn is used as the ground yarn. Further, the spacer yarn can be a polyester monofilament with a diameter of e.g. 0.12 mm. The specific specifications of the yarns may vary depending on the computerized flat knitting machine used and the specifications of the spacer fabric. The elastic yarn may also be, for example, a 33 dtex nylon/22 dtex spandex covered yarn, a 77 dtex high-elasticity nylon yarn, a high-elasticity polyester yarn, or the like. The non-elastic yarn may be, for example, a 110 dtex/48F low-elasticity polyester yarn, or the like.

In the second aspect of the present invention, the present invention provides a method for preparing a weft-knitted spacer fabric, comprising: weaving on a double needle bar computerized flat knitting machine with an electronic needle selection device, wherein firstly weaving two courses of the single-side texture of the upper surface layer and the lower surface layer respectively on the front and rear needle bars with non-elastic and elastic yarns in the form of plating, and then connecting the upper surface layer and the lower surface layer together by using the spacer yarns to weave through the selected tuck needle of the front and rear needle bars, characterized in that the connecting distance of the tuck is changed by changing the program design in the computerized flat knitting machine. Specifically, by changing the program design in the CAD adapted to the computerized flat knitting machine, the needle selector is controlled by the electronic signal so as to change the connecting distance of the tuck.

Further, in the above preparation method, with the aid of the empty needle on the rear needle bar and the lateral movement of the rear needle bar, the front needle bar can transfer the loop to the adjacent 1-5 needles, preferably 1 needle or 2 needles, on the same bar by using the selected needle, and the front needle bar is moved to the loop (i.e., at the corresponding position of the upper and lower surface layers) to form distributed meshes.

In one embodiment, the arrangement density of the spacer yarns is changed by keeping the connecting distance of the tuck constant and selectively changing the number of spacer yarns in a local region.

In addition, the fabric is heat set after it is removed from the computerized flat knitting machine. The heat-setting treatment is carried out by applying a certain tension (for example 0.1-10 N/cm, preferably 1-8 N/cm, particularly preferably 2-3 N/cm) at a certain temperature, for example, 140-180° C., preferably 150-170° C., particularly preferably 155-165° C. for 1-10 minutes, preferably 1.5-6 minutes, and particularly preferably 2-3 minutes, thereby causing a certain shrinkage of the fabric and an increase in the mesh size of the surface layers and maintaining the dimensional stability.

The computerized flat knitting machine used may be an E12, E14 gauge, or the like.

In the third aspect of the invention, the invention provides use of the weft-knitted spacer fabric of the present invention for the preparation of a composite material, in particular a sole material.

The composite material is prepared by infusing a resin into the weft-knitted spacer fabric of the present invention. The resin may be an unsaturated polyester resin, an epoxy resin, a PU or the like, and is preferably a PU. The PU is preferably a PU foam.

In particular, the present PU foam composite is formed by mixing the reaction mixture for preparing the PU foam, then infusing the mixture into the spacer fabric. More particularly, the first step is to mix all the components for preparing the PU foam together homogeneously. Afterwards, the mixture is infused into a mould in which the weft-knitted spacer fabric has been already put. The infusion may be carried out by using vacuum-assisted resin transfer molding (VARTM) or by direct casting. The details of the process for preparing the PU foam composite and the raw materials for preparing the PU foam are described in PCT/CN2016/000574.

The PU foam used in the present invention is prepared by reacting the follow components,
(a) a di- or polyisocyanate,
(b) a polyether polyol or polyester polyol, and
(c) optionally a blowing agent.

The di- or polyisocyanates used can be any of the aliphatic, cycloaliphatic, or aromatic isocyanates known for producing PUs. Examples are diphenylmethane 2,2'-, 2,4-, and 4,4'-diisocyanate, the mixtures of monomeric diphenylmethane diisocyanates and of diphenylmethane diisocyanate homologs having a greater number of rings (polymeric MDI), isophorone diisocyanate (IPDI) or its oligomers, tolylene diisocyanate (TDI), for example tolylene diisoyanate isomers such as tolylene 2,4- or 2,6-diisocyanate, or a mixture of these, tetramethylene diisocyanate or its oligomers, hexamethylene diisocyanate (HDI) or its oligomers, naphthylene diisocyanate (NDI), or a mixture thereof.

The di- or polyisocyanates used preferably comprise isocyanates based on diphenylmethane diisocyanate, in particular comprising polymeric MDI. The functionality of the di- or polyisocyanates is preferably from 2.0 to 2.9, particularly preferably from 2.1 to 2.8. The viscosity of the di- or polyisocyanates at 25° C. to DIN 53019-1 to 3 is preferably from about 5 to about 600 mPas and particularly preferably from about 10 to about 300 mPas.

Di- and polyisocyanates can also be used in the form of polyisocyanate prepolymers. These polyisocyanate prepolymers are obtainable by reacting an excess of the polyisocyanates described above with compounds having at least two groups reactive toward isocyanates, for example at temperatures of from 30 to 100° C., preferably at about 80° C., to give the prepolymer. The NCO content of polyisocyanate prepolymers of the invention is preferably from 10 to 33% by weight of NCO, particularly preferably from 15 to 25% by weight of NCO.

The polyether polyols used to prepare the PU foam are obtained by known methods, for example by anionic polymerization of alkylene oxides with addition of at least one starter molecule which comprises from 2 to 8, preferably from 2 to 6, reactive hydrogen atoms in bound form in the presence of catalysts. As catalysts, it is possible to use alkali metal hydroxides such as sodium or potassium hydroxide or alkali metal alkoxides such as sodium methoxide, sodium or potassium ethoxide or potassium isopropoxide or, in the case of cationic polymerization, Lewis acids such as antimony pentachloride, boron trifluoride etherate or bleaching earth as catalysts. Furthermore, double metal cyanide compounds, known as DMC catalysts, can also be used as catalysts.

As alkylene oxides, preference is given to using one or more compounds having from 2 to 4 carbon atoms in the alkylene radical, e.g. ethylene oxide, 1,3-propylene oxide, tetrahydrofuran, 1,2- or 2,3-butylene oxide, in each case either alone or in the form of mixtures, and preferably ethylene oxide and/or 1,2-propylene oxide.

Possible starter molecules are, for example, ethylene glycol, diethylene glycol, glycerol, trimethylolpropane, pentaerythritol, sugar derivatives such as sucrose, sugar alcohol such as sorbitol, methylamine, ethylamine, isopropylamine, butylamine, benzylamine, aniline, toluidine, toluenediamine, naphthylamine, ethylenediamine, diethylenetriamine, 4,4'-methylenedianiline, 1,3-propanediamine, 1,6-hexanediamine, ethanolamine, diethanolamine, triethanolamine and other dihydric or polyhydric alcohols or monofunctional or polyfunctional amines.

The polyester polyol is usually prepared by condensation of polyfunctional alcohols having from 2 to 12 carbon atoms, e.g. ethylene glycol, diethylene glycol, butanediol, trimethylolpropane, glycerol or pentaerythritol, with polyfunctional carboxylic acids having from 2 to 12 carbon atoms, for example succinic acid, glutaric acid, adipic acid, suberic acid, azelaic acid, sebacic acid, decanedicarboxylic acid, maleic acid, fumaric acid, phthalic acid, isophthalic acid, terephthalic acid, the isomers of naphthalenedicarboxylic acids or the anhydrides of the acids mentioned. The polyfunctional carboxylic acid also includes other sources of dicarboxylic acids like dimethylterephthalate (DMT), polyethyleneglycol-terephthalate and the like.

The polyether polyol or the polyester polyol used herein has a functionality of from about 1.7 to about 2.5, preferably from about 1.8 to about 2.4, more preferably from about 1.8 to about 2.3. Moreover, the polyether polyol or the polyester polyol used herein has a hydroxyl number of from about 50 to about 270 mg KOH/g, preferably from about 55 to about 200 mg KOH/g, more preferably from about 55 to about 150 mg KOH/g, even more preferably from about 55 to about 100 mg KOH/g, most preferably from about 55 to about 80 mg KOH/g. It was surprising to find that when the functionality and the hydroxyl number of the polyether polyol or the polyester polyol fall into the ranges mentioned-above, a weft-knitted spacer fabric reinforced PU composite with high mechanical properties and unique anisotropic effect was obtained, which made the composite to be suitable to use in the footwear, in particularly the shoe sole.

The molecular weight of the polyether polyol or the polyester polyol is from about 500 to about 6000, preferably from about 600 to about 4000, more preferably from about 1000 to about 2500. Moreover, the polydispersion index of the polyether polyol or polyester polyol is within a specific range, such as from about 0.8 to about 1.3, preferably from about 0.9 to about 1.2, more preferably from about 0.95 to about 1.1. Within the mentioned polydispersion index, the obtained composite has the best balance between hardness and flexibility.

The reaction mixture used to prepare the PU foam may further comprise a crosslinker and/or a chain extender.

As the chain extender and/or crosslinker, use is made of, in particular, bifunctional or trifunctional amines and alcohols, in particular diols, triols or both, in each case having molecular weights of less than 350, preferably from 60 to 300 and in particular from 60 to 250. Here, bifunctional compounds are referred to as chain extenders and trifunctional or higher-functional compounds are referred to as crosslinkers. It is possible to use, for example, aliphatic, cycloaliphatic and/or aromatic diols having from 2 to 14, preferably from 2 to 10, carbon atoms, e.g. ethylene glycol, 1,2-, 1,3-propanediol, 1,2-, 1,3-pentanediol, 1,10-decanediol, 1,2-, 1,3-, 1,4-dihydroxycyclohexane, diethylene glycol and triethylene glycol, dipropylene glycol and tripropylene glycol, 1,4-butanediol, 1,6-hexanediol and bis(2-hydroxyethyl)hydroquinone, triols such as 1,2,4-, 1,3,5-trihydroxycyclohexane, glycerol and trimethylolpropane and low molecular weight hydroxyl-comprising polyalkylene oxides based on ethylene oxide and/or 1,2-propylene oxide and the abovementioned diols and/or triols as starter molecules.

The chain extender can be an individual compound or a mixture. The chain extender preferably comprises propylene glycol, dipropylene glycol, tripropylene glycol and/or 2,3-butanediol either alone or optionally in mixtures with one another or with further chain extenders. Thus, in a particularly preferred embodiment, dipropylene glycol is used together with a second chain extender, for example 2,3-butanediol, mono-propylene glycol or diethylene glycol, as chain extender.

The crosslinker is preferably 1,2,4-, 1,3,5-trihydroxycyclohexane, glycerol and/or trimethylolpropane. Preference is given to using glycerol as crosslinker.

The reaction mixture used to prepare the PU foam may further comprise a blowing agent. The blow agent may be physical blowing agent or chemical blowing agent.

The physical blowing agents are compounds which are inert toward the starting components and are usually liquid at room temperature and vaporize under the conditions of the urethane reaction. The boiling point of these compounds is preferably below 50° C. Physical blowing agents also include compounds which are gaseous at room temperature and are introduced into or dissolved in the starting components under pressure, for example carbon dioxide, low-boiling alkanes, fluoroalkanes and fluoroolefins.

The physical blowing agents are usually selected from the group consisting of alkanes and cycloalkanes having at least 4 carbon atoms, dialkyl ethers, esters, ketones, acetals, fluoroalkanes, fluoroolefins having from 1 to 8 carbon atoms and tetraalkylsilanes having from 1 to 3 carbon atoms in the alkyl chain, in particular tetramethylsilane.

Examples which may be mentioned are propane, n-butane, isobutane and cyclobutane, n-pentane, isopentane and cyclopentane, cyclohexane, dimethyl ether, methyl ethyl ether, methyl butyl ether, methyl formate, acetone and fluoroalkanes which can be degraded in the troposphere and therefore do not damage the ozone layer, e.g. trifluoromethane, difluoromethane, 1,1,1,3,3-pentafluorobutane, 1,1,1,3,3-pentafluoropropane, 1,1,1,2-tetrafluoroethane, difluoroethane and heptafluoropropane. Examples of fluoroolefins are 1-chloro-3,3,3-trifluoropropene, 1,1,1,4,4,4-hexafluorobutene. The physical blowing agents mentioned can be used alone or in any combinations with one another. Preference is given to using 1,1,1,3,3-pentafluoropropane as HFC-245fa from Honeywell International Inc., 1-chloro-3,3,3-trifluoropropene as HCFO-LBA2 from Honeywell International Inc. or as AFA-L1 from Arkema SA, 1,1,1,4,4,4-hexafluorobutene as HFO FEA1100 from Dupont.

The physical blowing agent (c) is used in such an amount that the density of the PU foam is, without taking into account the reinforcing material, preferably in the range from about 75 to about 150 kg/m³, more preferably from about 90 to about 130 kg/m³, most preferably from about 100 to about 110 kg/m³.

As chemical blowing agents, water and/or formic acid could be used. These react with isocyanate groups with elimination of carbon dioxide or, respectively, carbon dioxide and carbon monoxide. In one embodiment, water is preferably used as the blowing agent. The amount of water is preferred in a range of 0.1 to 2.0% by weight, based on the weight of the reaction mixture.

According to the present invention, the reaction for forming the PU foam is carried out in the presence of a catalyst (d).

As catalysts (d), it is possible to use all compounds which accelerate the isocyanate-polyol reaction. Such compounds are known and are described, for example, in "Kunststoffhandbuch, volume 7, PU", Carl Hanser Verlag, $3^{rd}$ edition 1993, chapter 3.4.1. These comprise amine-based catalysts and catalysts based on organic metal compounds.

As catalysts based on organic metal compounds, it is possible to use, for example, organic tin compounds such as tin(II) salts of organic carboxylic acids, e.g. tin(II) acetate, tin(II) octoate, tin(II) ethylhexanoate and tin(II) laurate, and the dialkyltin(IV) salts of organic carboxylic acids, e.g. dibutyltin diacetate, dibutyltin dilaurate, dibutyltin maleate and dioctyltin diacetate, and also bismuth carboxylates e.g. bismuth(III) neodecanoate, bismuth 2-ethylhexanoate and bismuth octanoate, or alkali metal salts of carboxylic acids, e.g. potassium acetate or potassium formate.

Preference is given to using a tertiary amine or a mixture comprising at least one tertiary amine as catalyst (d). These tertiary amines are usually compounds which can also bear groups which are reactive toward isocyanate, e.g. OH, NH or $NH_2$ groups. Some of the most frequently used catalysts are bis(2-dimethylaminoethyl) ether, N,N,N,N,N-pentamethyldiethylenetriamine, N,N,N-triethylaminoethoxyethanol, dimethylcyclohexylamine, dimethylbenzylamine, triethylamine, triethylenediamine, pentamethyldipropylenetriamine, dimethylethanolamine, N-methylimidazole, N-ethylimidazole, tetramethylhexamethylenediamine, tris(dimethylaminopropyl)hexahydrotriazine, dimethylaminopropylamine, N-ethylmorpholine, diazabicycloundecene and diazabicyclononene.

According to the present invention, the reaction for forming the PU foam is carried out in the presence of one or more foam stabilizer (e).

The term foam stabilizer refers to materials which promote formation of a regular cell structure during foam formation. Examples which may be mentioned are: silicon-comprising foam stabilizers such as siloxane-oxyalkylene copolymers and other organopolysiloxanes. Alkoxylation products of fatty alcohols, oxo alcohols, fatty amines, alkylphenols, dialkylphenols, alkylcresols, alkylresorcinol, naphthol, alkylnaphthol, naphthylamine, aniline, alkylaniline, toluidine, bisphenol A, alkylated bisphenol A, polyvinyl alcohol and also further alkoxylation products of condensation products of formaldehyde and alkylphenols, formaldehyde and dialkylphenols, formaldehyde and alkylcresols, formaldehyde and alkylresorcinol, formaldehyde and aniline, formaldehyde and toluidine, formaldehyde and naphthol, formaldehyde and alkylnaphthol and also formaldehyde and bisphenol A or mixtures of two or more of these foam stabilizers can also be used.

Foam stabilizers are preferably used in an amount of from about 0.5 to about 4% by weight, particularly preferably from about 1 to about 3% by weight, based on the total weight of the PU foam.

In one embodiment, the reaction for forming the PU foam is carried out in the presence of further additives and/or auxiliaries (f).

Auxiliaries and/or additives which may be used are substances known per se for this purpose, e.g. surfactants, foam stabilizers, cell regulators, fillers, pigments, dyes, antioxidants, hydrolysis stabilizers, antistatic agents, fungi static agents, and bacteriostatic agents.

Further details concerning the starting materials used for carrying out the inventive process, blowing agents, catalysts, and also auxiliaries and/or additives are found by way of example in Kunststoffhandbuch [Plastics Handbook], volume 7, "PU", Carl-Hanser-Verlag Munich, 1st edition, 1966, 2nd edition, 1983, and 3rd edition, 1993.

The PU foam is in-situ formed during the preparation of the reinforced material.

The weft-knitted spacer fabric reinforced PU composite of the present invention has improved mechanical properties over the unreinforced PU foam. More particularly, the weft-knitted spacer fabric reinforced PU composite of the present invention has an improved tensile strength, and especially a greatly improved tear strength.

More importantly, the weft-knitted spacer fabric reinforced PU composite of the present invention has a unique anisotropy. In the context of the present invention, "anisotropy" is intended to mean that the weft-knitted spacer fabric reinforced PU composite possesses different properties in different directions. For example, the mechanic properties in the direction perpendicular to the spacer yarns are superior to the other two directions perpendicular to it.

The above-mentioned improved mechanical properties and the anisotropy make the present weft-knitted spacer fabric reinforced PU composite to be useful in the footwear, in particularly in the shoe sole. The improved mechanical properties prolong the sole life, and the anisotropy helps to make the ankle to be stable and comfort during walking or running. The appearance of this composite also allows the freedom for design of the shoes.

In another aspect, the present invention is directed to a process for preparing the weft-knitted spacer fabric reinforced PU composite of the present invention, which comprises adding the weft-knitted spacer fabric and the starting materials of the PU composite into a mould and then foaming.

Before adding into the mould, the starting materials of the PU foam were mixed firstly with a mixing apparatus such as a vollrath mixer.

The dosing sequence of the weft-knitted spacer fabric and the mixed starting materials of the PU foam is not critical. Actually, it is possible to add the fabric into the mould firstly, then add the starting materials of the PU foam, or it is possible to add the starting materials of the PU foam into the mould firstly, then add the fabric, or it is possible to stick the fabric onto the inner surface (up and bottom) of the mould, then add the starting materials of the PU foam.

In particularly, the weft-knitted spacer fabric reinforced PU composite is formed by mixing the reaction mixture for preparing the PU foam, then infusing the mixture into the weft-knitted spacer fabric. More particularly, the first step is to mix all the components for preparing the PU foam together homogeneously. Afterwards, the mixture is infused into a mould in which the weft-knitted spacer fabric has been already put. The infusion may be carried out by using vacuum-assisted resin transfer molding (VARTM) or by direct casting. In this regard, it is surprising to find that by using the specific formulation of the PU foam of the present invention, the raw materials for forming the PU foam can be directly, i.e., without using any assistant equipment such as vacuum-assisted infusion equipments, infused into the mould in which the weft-knitted spacer fabric has been already put. This makes the infusion to be easier and reduces the manufacturing cost.

The infusion could be carried out in such a way that the reaction mixture for preparing the PU foam flows through the weft-knitted spacer fabric in the spacer yarn direction. During the infusion, due to the presence of meshes in the upper and lower surface layers, the reaction mixture can be easily infused via the meshes to fill the voids between the spacer yarns. During the preparation, the top and bottom surfaces of the mould can be heated, such as by electricity or a water bath heating system. The temperature during the infusion is from about 20 to about 50° C. Simultaneously with the forming of the composite, the PU foams. After the infusion, the temperature is maintained for a certain time, such as about 5 to about 30 minutes, in order to continue foaming. After foaming, the composite is removed from the mould and is left to stand still for a certain time, such as about 8 to about 32 hours, preferably about 10 to about 24 hours, until the composite is stable.

It has been found that the composite of the present invention possesses improved mechanical performances and unique properties such as unique anisotropic effect. For footwear, in particularly for a shoe sole, it is generally required to bend easily up and down at the part corresponding to the foot arch, while not deform easily in the horizontal planes. Therefore, the unique anisotropic effect of the composite of the present invention makes it to be highly suitable for use in the footwear, especially the shoe sole. Moreover, the improved mechanical performances of the composite of the present invention make the resulted footwear, especially the shoe sole to possess high mechanical performances.

Therefore, in a further aspect, the present invention is directed to the use of the weft-knitted spacer fabric reinforced PU composite of the present invention in a footwear, in particularly in a shoe sole.

In a further aspect, the present invention is directed to a footwear, in particularly a shoe sole comprising the weft-knitted spacer fabric reinforced PU composite according to the present invention.

When preparing the shoe sole, the weft-knitted spacer fabric is put into the raw material of the PU foam in the mould in such a way that the direction of the spacer yarns constitutes the thickness direction of the resulted shoe sole, while the top and bottom layers of the fabric are parallel to the top and bottom of the resulted shoe sole. In this case, when walking or running, the sole would bend up and down, i.e., in the direction of perpendicular to the spacer yarns, while in another two directions, the sole would not deform easily.

The present invention uses the weft-knitted spacer fabric to compound with the PU foam to produce the sole material. On one hand, the weft-knitting spacer fabric can eliminate the phenomenon of the lodging of the spacer yarns caused by the repeated compression of the weft-knitted spacer fabric, and on the other hand, the strength of the PU foam can be improved, thereby significantly improving the overall compression resistance and durability of the sole material. In addition, the thickness change of the spacer fabric can be consistent with the thickness change of the sole, and it plays a reinforcing role in the parts with different thicknesses. According to the bearing conditions of different parts of the sole, the arrangement density of the spacer yarns can be increased at locations where the load is heavy, and conversely, the arrangement density of the spacer yarns can be reduced, thereby the different reinforcing effects of the weft-knitted spacer fabric in different parts of the shoe sole are fully exploited.

BRIEF DESCRIPTION OF THE DRAWINGS

Referring to FIG. 1, the weft-knitted spacer fabric of the present invention consists of an upper surface layer 1, a lower surface layer 2, and intermediate spacer yarns 3, and the upper surface 1 and the lower surface layer 2 are connected by the tuck of the spacer yarns 3 in the upper surface and the lower surface layers to form a three-dimensional structure in an integrated manner, and a PU foam 4 is filled between the spacer yarns. The X, Y, and Z coordinates represent the weft-knitted spacer fabric courses, wale, and thickness directions, respectively. The thickness of local regions (such as region A and C) of the weft-knitted spacer fabric can be changed by changing the connecting distance of the tuck between the upper surface layer and the lower surface layer and by the action of the elastic yarns of the both surface layers. In addition, the arrangement density of the spacer yarns of local regions (such as region A and B) of the weft-knitted spacer fabric can also be changed.

Referring to FIG. 2, the weft-knitted spacer fabric of the present invention is woven on a double-needle bar computerized flat knitting machine with a gauge of E12 which is provided with an electronic needle selection device. With the reciprocating movement of the head (indicated by the left and right arrows), firstly, 167 dtex/96F low-elasticity polyester yarn as the plating yarn and 44 dtex nylon/33 dtex spandex covered yarn as the ground yarn are used to weave the 1st and 3rd rows on the front needle bar F and the 2nd and 4th rows on the rear needle bar B, respectively, that is, two courses of each of the upper surface layer and the lower surface layer are formed, respectively. Next, 0.12 mm polyester monofilaments are used as the spacer yarns, and the upper surface layer and the lower surface layer of rows 1-4 are connected by weaving the 5th and 6th rows with the tuck across two needles. The cyclic weaving of rows 1-6 can increase the number of courses of weft-knitted spacer fabric. After the fabric is removed from the machine, it will shrink laterally under the action of the elasticity of the spandex covered yarn, causing the spacer yarns to deflect in the direction perpendicular to the upper surface layer and the lower surface layer, thereby increasing the fabric thickness. After a heat-setting treatment, the thickness of the fabric is slightly reduced because of the tension applied, but the surface meshes are enlarged, which is favorable for the infusion and filling of the PU foam. If after the rows 1-4 are knitted, 0.12 mm polyester monofilaments are still used as the spacer yarns, and the upper and lower surface layers of rows 1-4 are connected by weaving rows 7-10 with the tuck across four needles, it is then thicker than the fabric woven in rows 1-6, thereby the change of the thickness of the weft-knitted spacer fabric in the wale direction is achieved. If after the rows 1-4 are knitted, 0.12 mm polyester monofilaments are still used as the spacer yarns, and the upper and lower surface layers of rows 1-4 are connected by weaving rows 11-14 with the tuck across two needles and four needles, the change of the thickness of the weft-knitted spacer fabric in the course direction is then achieved, that is, the fabric on the left side with tuck across two needles is thin and the fabric on the right side with tuck across four needles is thick. FIG. 3 shows the effect of changing the thickness of the weft-knitted spacer fabric in the wale direction. The raw materials used for the whole fabric are same, and the weaving methods for the upper and lower surface layers in the regions A, B, and C are same, except that the connecting distances of the tucks of the spacer yarns are different, namely, across 2 needles, 4 needles, and 6 needles, respectively. As a result, a structure is formed in which the A region is thin (with a thickness of 3.67 mm), the B region is medium (with a thickness of 5.46 mm), and the C region is thick (with a thickness of 7.27 mm).

Referring to FIG. 4, the method of weaving the upper surface layer and the lower surface layer in the rows 1-4 is as same as FIG. 2. In rows 5-10, the spacer yarns are connected by tuck across 2 needles on the left and right sides, connected by tuck across six needles in the middle, thus after the fabric is removed from the machine, the middle part of the fabric is thicker than the left and right sides by the action of the elasticity of the spandex covered yarn. In addition, the left and right sides are connected by the tuck of two spacer yarns, and the middle is connected by the tuck of six spacer yarns. This is mainly to ensure that the arrangement density of the spacer yarns in the middle part is as same as those of the left and right sides, that is, whether it is on the front needle bar F or on the rear needle bar B, there is a tuck connection on every two needles. The cyclic weaving of rows 1-10 could increase the number of courses of the fabric. FIG. 5 shows the effect of changing the thickness of the weft-knitted spacer fabric in a local region, wherein the thickness of the black rectangular region (7.16 mm) is greater than that of other regions (3.56 mm)

Referring to FIG. 6, the method of weaving the upper surface layer and the lower surface layer in the rows 1-4 is as same as FIG. 2. In rows 5-10, every spacer yarns are connected by the tuck across 6 needles, thus after the fabric is removed from the machine, the thickness of the left and right sides is as same as that of the middle part by the action of the elasticity of the spandex covered yarn. However, whether it is on the front needle bar F or on the rear needle bar B, there is one tuck connection on every six needles on the left and right sides, and there is one tuck connection on every two needles in the middle, that is, the arrangement density of the spacer yarns in the middle part is greater than that of the left and right sides. FIG. 7 shows the effect of changing the arrangement density of the spacer yarns of the weft-knitted spacer fabric in a local region, wherein the black spacer yarns are arranged in the densest manner on the left, followed by the middle region, and the sparsest on the right.

Referring to FIG. 8, the method of weaving the upper surface layer and the lower surface layer in the rows 1-2 is as same as FIG. 2. In the 3rd row, the needle of the front needle bar corresponding to the empty needle of the rear needle bar is selected to transfer the loop to the empty needle, and in the 4th row, the rear needle bar moves to the right by one stitch distance, and the loop moved to the rear needle bar is moved back to the front needle bar, thus a distributed mesh is formed on the upper surface layer woven by the front needle bar at the site where the loop is removed (dotted ellipse). In the 5th row, the needle of the rear needle bar corresponding to the empty needle of the front needle bar is selected to transfer the loop to the empty needle, and in the 6th row, the rear needle bar moves to the left by two needles distance, and the loop moved to the front needle bar is moved back to the rear needle bar, thus a distributed mesh is formed on the lower surface layer woven by the rear needle bar at the site where the loop is removed (dotted ellipse). In the row after the 6th row, the rear needle bar moves to the right by one stitch to restore the initial position. Finally, in the 7th and 8th rows, one row on each of the two surface layers is knitted to prepare for the next step of weaving the tuck connection of the spacer yarns. From FIG. 3, FIG. 5 and FIG. 7, the effect of the formation of the distributed meshes on the surface layer of the weft-knitted spacer fabric is shown.

Further embodiments of the present invention are described in the claims, the description and the examples. It goes without saying that the features mentioned above and features still to be explained below can be used not only in the combination indicated in each case but also in other combinations without going outside the scope of the invention.

The advantages of the invention are illustrated by the following examples.

EXAMPLES

1. Measuring Method

During the experiments, the flexibility, density, hardness and the mechanical properties of the weft-knitted spacer fabric reinforced PU composite are measured.

The density of the weft-knitted spacer fabric reinforced PU composite is measured from the top layer to the sole layer by using DPX300 LTE density Analyzer. According to the test standard, samples with size of 5 cm (Length)×5 cm (Width)×1 cm (Thickness) should be prepared, then put into chamber and scanned by X-ray. Thus, the density distribution chart will be obtained.

The hardness of the weft-knitted spacer fabric reinforced PU composite is measured according to the test standard of ASTMD 2240 in the direction of the spacer yarns by using Asker C durometer available from KOBUNSHI KEIKI Co, Ltd.

The tensile strength of the weft-knitted spacer fabric reinforced PU composite is measured in the direction of the spacer yarns according to the test standard of DIN 53504 by using Zwick/Roell testing machine available from Zwick Roell Instrument & Technology Co, Ltd.

The tear strength of the weft-knitted spacer fabric reinforced PU composite is measured in the direction of the spacer yarns according to the test standard of DIN ISO 34-1 method A by using Zwick/Roell testing machine available from Zwick Roell Instrument & Technology Co, Ltd.

The elongation of the weft-knitted spacer fabric reinforced PU composite is measured in the direction of perpendicular to the spacer yarns according to the test standard of DIN 53504 by using Zwick/Roell testing machine available from Zwick Roell Instrument & Technology Co, Ltd.

The flexibility is measured by bending the weft-knitted spacer fabric reinforced PU composite by hand. If the test plate could be bent over 30° in the direction of perpendicular to the spacer yarns, the flexibility is good; if the test plate could not be bent over 30°, the flexibility is poor.

For the polyester recipe, a hydrolysis test is also carried out. The hydrolysis test of the weft-knitted spacer fabric reinforced PU composite is measured according to the test standard of DIN EN ISO 20344.

2. Procedure to Prepare the Composites

Figure 1:
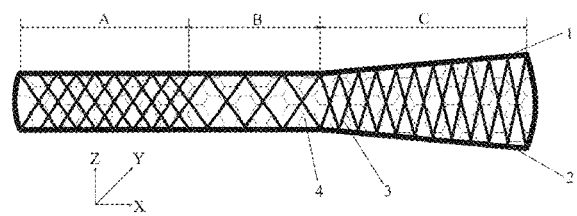
FIG. 1 is a schematic structural view of a variable-thickness and variable-density weft-knitted spacer fabric-reinforced PU foam composite material for a shoe sole of the present invention.
Figure 2:
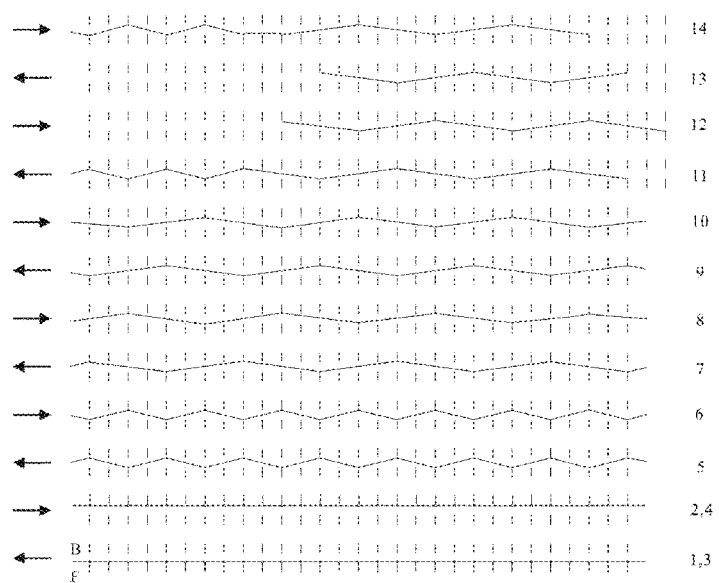
FIG. 2 is a weaving principle diagram of the surface layer and the variable thickness of the weft-knitted spacer fabric of the present invention.
Figure 3:
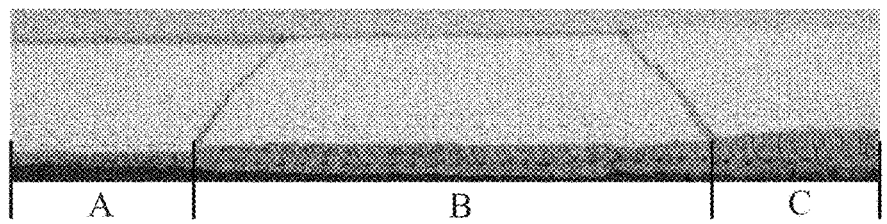
FIG. 3 is a diagram illustrating the effect of changing the thickness of the weft-knitted spacer fabric of the present invention in the wale direction.
Figure 4:
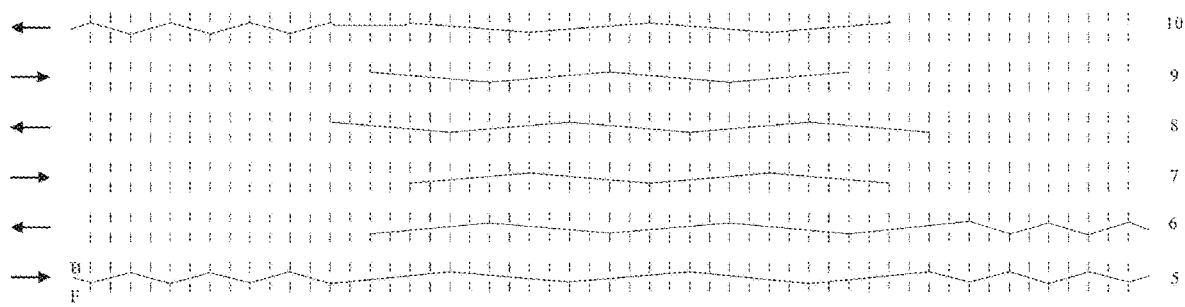
FIG. 4 is a weaving principle diagram of the weft-knitted spacer fabric according to the present invention with variable thickness in a local region.
Figure 5:
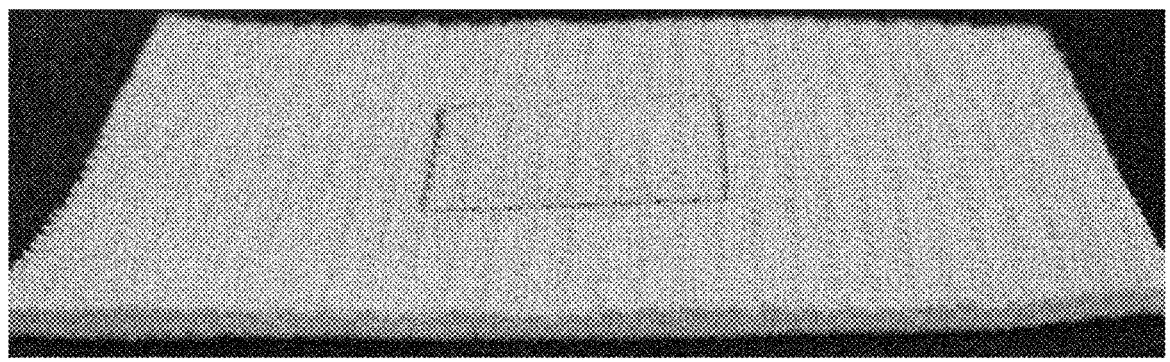
FIG. 5 is a diagram illustrating the effect of changing the thickness of the weft-knitted spacer fabric of the present invention in a local region
Figure 6:
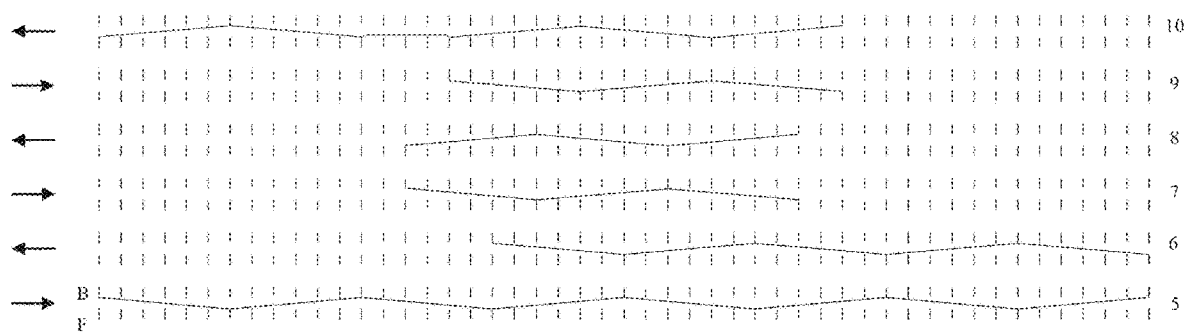
FIG. 6 is a weaving principle diagram of the weft-knitted spacer fabric of the present invention in which the arrangement density of the spacer yarns is changed in a local region.
Figure 7:
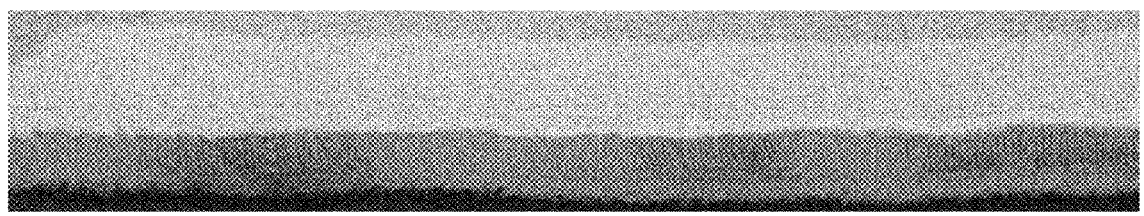
FIG. 7 is a diagram illustrating the effect of changing the arrangement density of the spacer yarns of the weft-knitted spacer fabric of the present invention in a local region.
Figure 8:
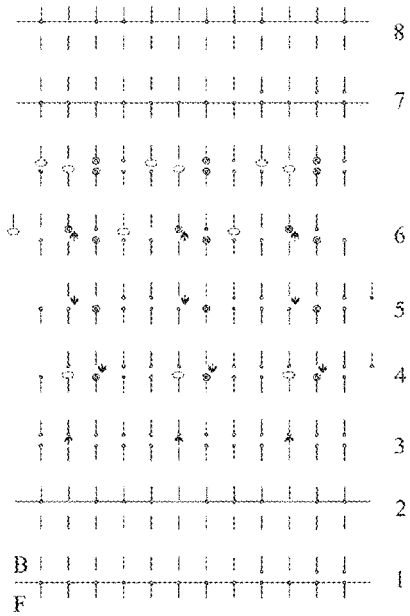
FIG. 8 is a weaving principle diagram of forming the distributed meshes in the surface layer of the weft-knitted spacer fabric of the present invention.
Figure 9:
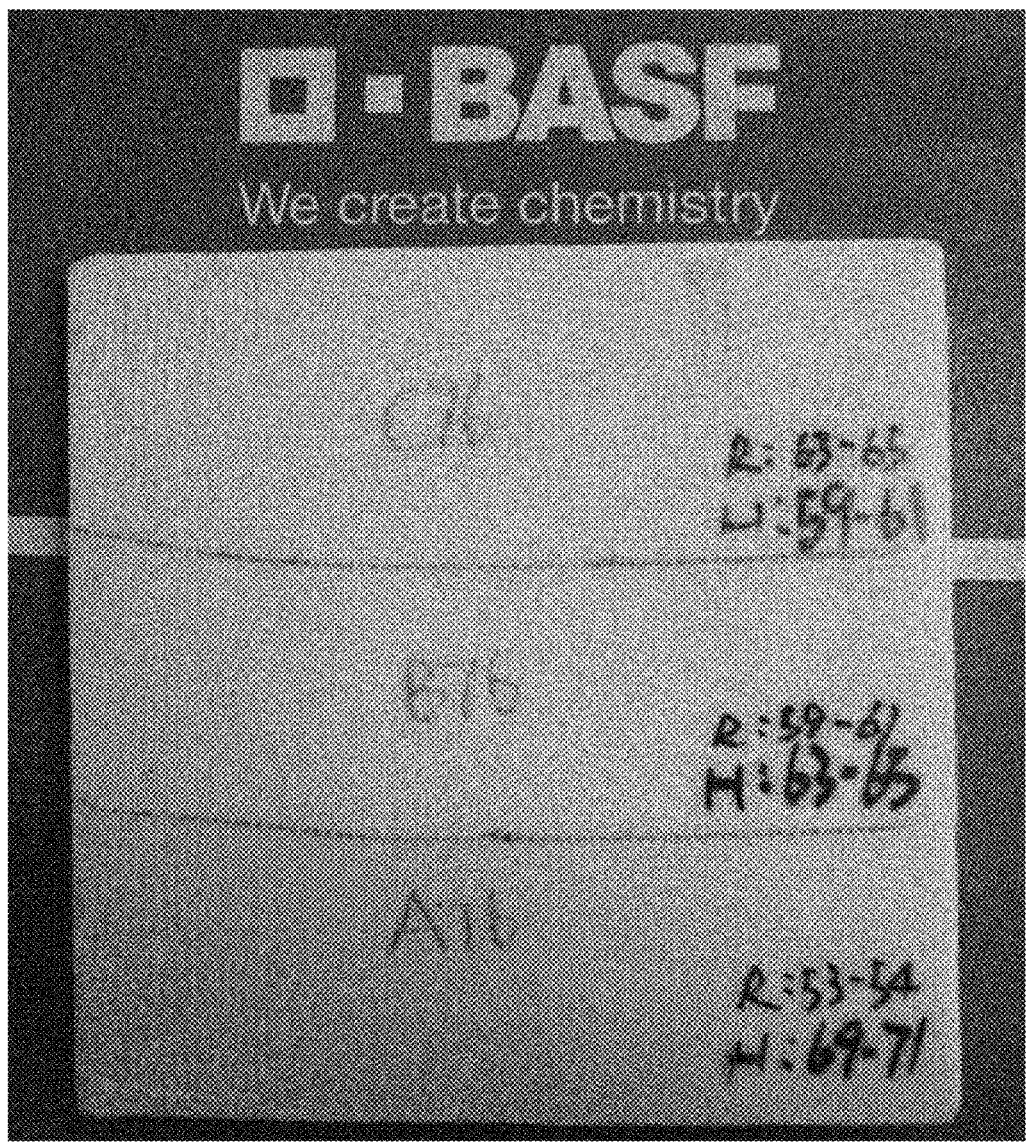
FIG. 9 shows the weft-knitted spacer fabric reinforced PU composite obtained according to the example of the present invention.

A component (for the sports system, keeping A component at 35° C.) and B component shown in Table 1 were prepared respectively by mixing the corresponding components. At the same time, the temperature of the mould was kept at 23° C.; Then 65 g of A component and 45 g B of component were put into one plastic cup, mixed for from 7 to 8 seconds with a mixing machine (the type of EWTHV 0.5, vollrath mixer). 62 g of the mixture of A and B components was put into the mould. Then a weft-knitted spacer fabric of FIG. 3 was put into the mixture in a manner that the top and bottom layers of the fabric are parallel to the bottom of the mould, and the fabric is placed in the center of the mould. Then the mould was closed. Fifteen minutes later, the mould was open and the sample was taken out, and kept at room temperature for 24 h to cure, thus a weft-knitted spacer fabric reinforced PU composite was obtained (FIG. 9).

Tests were carried out according to the standards described above on the obtained plates to determine the density, hardness and rebound.

TABLE 2

The properties of the plates based on sports recipe (Polyether system)

|  | Original | Zone A76 | Zone B76 | Zone C76 |
| --- | --- | --- | --- | --- |
| Density (g/cc) | 320 | 374 | 369 | 348 |
| Hardness (Asker C) | 47 | 69~71 | 63~65 | 59~61 |
| Rebound | 59~61 | 53~54 | 59~61 | 63~65 |

As can be seen from Table 2, by being mediated with the weft-knitted spacer fabric, the PU composite shows zonal performance, three areas show three varied hardness.

The test plates (FIG. 9) obtained from the recipe could be bent over 30° in the direction of perpendicular to the spacer yarns, while hardly be bent in the other two directions perpendicular to it.

The invention claimed is:

1. A weft-knitted spacer fabric consisting of an upper surface layer, intermediate spacer yarns, and a lower surface layer, wherein the upper surface layer and the lower surface layer use two yarns, non-elastic and elastic yarns, and there are tucks formed by the intermediate spacer yarns between the upper and lower surface layers, so that the upper surface is connected with the lower surface layer to form a three-dimensional structure in an integrated manner, characterized in that by selectively using a tuck with a different connecting distance in a local region than other regions and by an action of the elastic yarns in the upper and lower surface layers, a thickness of a local region is changed.

2. The weft-knitted spacer fabric according to claim 1, characterized in that the thickness in a wale direction of the weft-knitted spacer fabric is changed by changing a con-

TABLE 1

Basic recipe (sports recipe)

| A-component | Description | Functionality | MW | OH value [mg KOH/g] | Parts |
| --- | --- | --- | --- | --- | --- |
| PTHF 2000 | Polyether polyol, available from BASF Polyurethane (China) Co, Ltd | 2 | 2000 | 56.1 | 96.2 |
| Lupragen N203 | Catalyst, available from BASF Polyurethane (china) Co, Ltd |  |  |  | 0.8 |
| Dabco DC 193 | Surfactant, available from Air Products & Chemicals (China) Investment Co., Ltd. |  |  |  | 0.3 |
| Tegostab B 8491 | Surfactant, available from Evonik Specialty Chemicals (Shanghai) Co, Ltd |  |  |  | 1.00 |
| Water | Blowing agent |  |  |  | 1.20 |
| DEOA | Crosslinker, available from BASF Polyurethane (China) Co, Ltd |  |  |  | 0.50 |
| B-component |  |  |  | NCO |  |
| ISO 137/53 available from BASF Polyurethane Specialties (China) Company Ltd. |  |  |  | 18.5% |  | necting distance of the tuck in different courses and by the action of the elastic yarns in the upper and lower surface layers.

3. The weft-knitted spacer fabric according to claim 1, characterized in that the thickness in a course direction of the weft-knitted spacer fabric is changed by changing the connecting distance of the tuck in different loops in the same course and by the action of the elastic yarns in the upper and lower surface layers.

4. The weft-knitted spacer fabric according to claim 1, characterized in that distributed meshes are formed in the upper and lower surface layers by selectively loop transferring.

5. The weft-knitted spacer fabric according to claim 1, characterized in that an arrangement density of the spacer intermediate yarns in a local region is changed by keeping the connecting distance of the tuck constant and selectively changing a number of intermediate spacer yarns in the local region.

6. The weft-knitted spacer fabric according to claim 1, characterized in that the non-elastic yarns are selected from a 167 dtex/96F low-elasticity polyester yarn or a 110 dtex/48F low-elasticity polyester yarns; and the elastic yarns are selected from a 33 dtex nylon/22 dtex spandex covered yarn, a 77 dtex high-elasticity nylon yarn or a high-elasticity polyester yarn.

7. A method for preparing the weft-knitted spacer fabric according to claim 1, the method comprising:
weaving on a double needle bar computerized flat knitting machine with an electronic needle selection device, wherein firstly weaving two courses of a single-side texture of the upper surface layer and the lower surface layer respectively on front and rear needle bars with non-elastic and elastic yarns in a form of plating, and
connecting the upper surface layer and the lower surface layer together by using the intermediate spacer yarns to weave through a needle selection tuck of the front and rear needle bars, characterized in that the connecting distance of the tuck is changed by changing a program design in the computerized flat knitting machine.

8. The method according to claim 7, characterized in that with aid of an empty needle on the rear needle bar and a lateral movement of the rear needle bar, the front needle bar transfers a loop to an adjacent 1-5 needles on a same bed by using a selected needle, and the front needle bar is moved to the loop to form distributed meshes.

9. The method according to claim 7, wherein the connecting distance of the tuck is kept constant and number of intermediate spacer yarns in a local region is selectively changed.

10. The method according to claim 7, wherein the weft-knitted spacer fabric is heat set after the weft-knitted spacer fabric is removed from the computerized flat knitting machine.

11. A method for the preparation of a composite material, the method comprising:
using the weft-knitted spacer fabric according to claim 1 for the preparation of a composite material.

12. The method according to claim 11, wherein the composite material is a shoe material.

13. A composite material comprising the weft-knitted spacer fabric according to claim 1 and a resin.

14. The composite material according to claim 13, wherein the resin is an unsaturated polyester resin, an epoxy resin, or a polyurethane.

15. The composite material according to claim 14, wherein the polyurethane is prepared by reacting:
(a) a di- or polyisocyanate,
(b) a polyether polyol or polyester polyol, and
(c) optionally a blowing agent.

16. The composite material according to claim 15, wherein a functionality of the polyether polyol or the polyester polyol is from about 1.7 to about 2.5.

17. The composite material according to claim 15, wherein a hydroxyl number of the polyether polyol or the polyester polyol is from about 50 to about 270 mg KOH/g.

18. The composite material according to claim 15, wherein a molecular weight of the polyether polyol or the polyester polyol is from about 500 to about 6000.

19. The composite material according to claim 15, wherein a polydispersion index of the polyether polyol or polyester polyol is from about 0.8 to about 1.3.

20. A method for preparing the composite material according to claim 13, comprising infusing the resin into the weft-knitted spacer fabric.

21. The method according to claim 20, wherein the resin is a polyurethane, the method further comprising:
adding the weft-knitted spacer fabric and starting materials for preparing a polyurethane foam into a mold, and foaming.

22. The method according to claim 21, the method further comprising:
mixing a reaction mixture for preparing the polyurethane foam,
infusing the reaction mixture for preparing the polyurethane foam into the weft-knitted spacer fabric which has already been put into the mold.

23. The method according to claim 22, wherein the infusion is carried out by using vacuum-assisted resin transfer molding (VARTM) or by direct casting.

24. The method according to claim 22, wherein the infusion is carried out in such a way that the reaction mixture for preparing the polyurethane foam flows through the weft-knitted spacer fabric in an intermediate spacer yarn direction.

25. A shoe material comprising the composite material according to claim 13.

26. The shoe material according to claim 25, wherein the shoe material is a shoe sole.

* * * * *